(12) United States Patent
Kozloski et al.

(10) Patent No.: US 10,958,610 B2
(45) Date of Patent: Mar. 23, 2021

(54) GENERATING ALERTS BASED ON PREDICTED MOOD RESPONSES TO RECEIVED ELECTRONIC MESSAGES

(71) Applicant: International Business Machines Corporation, Armonk, NY (US)

(72) Inventors: James R. Kozloski, New Fairfield, CT (US); Clifford A. Pickover, Yorktown Heights, NY (US); Valentina Salapura, Chappaqua, NY (US); Maja Vukovic, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 166 days.

(21) Appl. No.: 15/866,512

(22) Filed: Jan. 10, 2018

(65) Prior Publication Data

US 2019/0215290 A1     Jul. 11, 2019

(51) Int. Cl.

| | |
|---|---|
| *H04L 12/58* | (2006.01) |
| *H04W 4/14* | (2009.01) |
| *G06N 20/00* | (2019.01) |
| *G06Q 10/10* | (2012.01) |
| *G06F 40/30* | (2020.01) |
| *G06F 40/216* | (2020.01) |

(52) U.S. Cl.
CPC .......... *H04L 51/24* (2013.01); *G06F 40/216* (2020.01); *G06F 40/30* (2020.01); *G06N 20/00* (2019.01); *G06Q 10/107* (2013.01); *H04L 51/22* (2013.01); *H04W 4/14* (2013.01)

(58) Field of Classification Search
CPC ......... H04L 51/24; H04L 51/22; G06N 20/00; G06F 17/2785; H04W 4/14
See application file for complete search history.

(56) References Cited

U.S. PATENT DOCUMENTS

| | | | |
|---|---|---|---|
| 7,565,404 B2 | 7/2009 | Gwozdz | |
| 8,032,602 B2 * | 10/2011 | Lavoie | .............. H04L 51/26 709/206 |
| 8,380,794 B2 | 2/2013 | Chakra et al. | |

(Continued)

FOREIGN PATENT DOCUMENTS

WO       2013019344 A1     2/2013

OTHER PUBLICATIONS

Perakyla et al.; "Sharing the Emotional Load: Recipient Affiliation Calms Down The Storyteller", ASA Research Article, vol. 78, Issue 4, Nov. 23, 2015, pp. 301-323.

(Continued)

*Primary Examiner* — Nafiz E Hoque
(74) *Attorney, Agent, or Firm* — Cantor Colburn LLP; Anthony Curro

(57) ABSTRACT

Embodiments include techniques to generate alerts based at least in part on predicted mood responses to received electronic communications that include receiving, using a processor system, a communication, and analyzing, using the processor system, contents of the communication. The techniques also include based at least in part on results of the analysis, predicting, using a machine learning system, a cognitive response of a recipient of the communication, and based at least in part on the predicted cognitive response, executing an alerting operation.

17 Claims, 7 Drawing Sheets

(56) References Cited

U.S. PATENT DOCUMENTS

| | | | |
|---|---|---|---|
| 8,996,639 B1* | 3/2015 | Faaborg | H04L 51/02 |
| | | | 455/412.1 |
| 9,015,089 B2 | 4/2015 | Servi et al. | |
| 9,088,535 B1 | 7/2015 | Baird et al. | |
| 9,350,690 B2 | 5/2016 | Meijer et al. | |
| 9,367,538 B2 | 6/2016 | Dua et al. | |
| 9,483,736 B2 | 11/2016 | Wan et al. | |
| 10,223,459 B2 | 3/2019 | Liu et al. | |
| 10,417,266 B2* | 9/2019 | Patel | G06F 17/27 |
| 2009/0245500 A1* | 10/2009 | Wampler | H04M 3/42382 |
| | | | 379/265.09 |
| 2012/0054642 A1* | 3/2012 | Balsiger | G06Q 10/10 |
| | | | 715/752 |
| 2012/0143693 A1 | 6/2012 | Chung et al. | |
| 2014/0287387 A1 | 9/2014 | Vukasnovic et al. | |
| 2015/0007312 A1* | 1/2015 | Pidathala | H04L 63/145 |
| | | | 726/22 |
| 2016/0019402 A1 | 1/2016 | Khandelwal | |
| 2016/0253552 A1 | 9/2016 | Rihn et al. | |
| 2016/0328988 A1 | 11/2016 | Gil et al. | |
| 2016/0379127 A1 | 12/2016 | Childress et al. | |
| 2019/0159716 A1* | 5/2019 | Alailima | A61B 5/163 |

OTHER PUBLICATIONS

Wolny, Wieslaw; "Emotion Analysis of Twitter Data That Use Emoticons and Emoji Ideograms", ISD 2016 Poland, 25th International Conference on, Sep. 25, 2016, pp. 476-483.

* cited by examiner

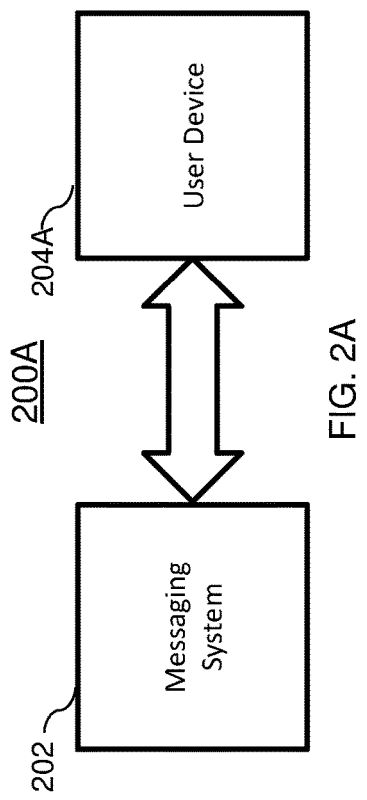
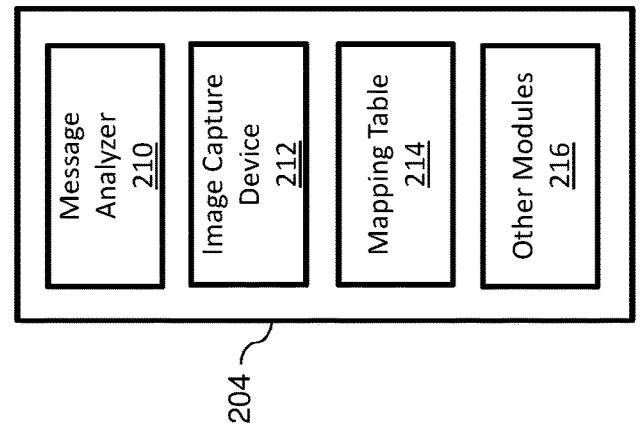

US 10,958,610 B2

GENERATING ALERTS BASED ON PREDICTED MOOD RESPONSES TO RECEIVED ELECTRONIC MESSAGES

TECHNICAL FIELD

The present invention generally relates to digital communications, and more specifically, to computer-implemented methods, computer systems and computer program products configured to generate alerts based at least in part on predicted mood responses to received electronic communications.

BACKGROUND

In today's environment, digital communications are widely used for personal and commercial applications. For example, a user may send a message through one of many social media applications to a friend, and employers may send messages through email applications regarding tasks that need to be addressed. Digital communications provide an efficient way to transfer information to one or more individuals located in different geographic locations. Also, enterprises use emails as a common method of communicating because messages can be easily prioritized and stored for convenience. The messages can be flagged with different priorities, such as urgent, to alert the recipient of its importance. In addition, the emails can be flagged for later review if the tasks are not critical to the mission. Also, messages/emails can be sorted by date, subject, sender, etc. according to the preference of the reader, instead of by the default order in which the message is received. Digital communications provide flexibility in email and messaging applications, which continues to add functionality that enhances the user's experience.

SUMMARY

Embodiments of the present invention are directed to a computer-implemented method to generate alerts based at least in part on predicted mood responses to received electronic communications. A non-limiting example of the computer-implemented method includes receiving, using a processor system, a communication, and analyzing, using the processor system, contents of the communication. The method also includes based at least in part on results of the analysis, predicting, using a machine learning system, a cognitive response of a recipient of the communication, and based at least in part on the predicted cognitive response, executing an alerting operation.

Embodiments of the present invention are directed to a system to generate alerts based at least in part on predicted mood responses to received electronic communications. A non-limiting example of the system includes a processor configured to receive, using a processor system, a communication, and analyze, using the processor system, contents of the communication. The system includes based at least in part on results of the analysis, predict, using a machine learning system, a cognitive response of a recipient of the communication, and based at least in part on the predicted cognitive response, execute an alerting operation.

Embodiments of the invention are directed to a computer program product to generate alerts based at least in part on predicted mood responses to received electronic communications, the computer program product including a computer readable storage medium having program instructions embodied therewith. The program instructions are executable by a processor to cause the processor to perform a method. A non-limiting example of the method includes receiving, using a processor system, a communication, and analyzing, using the processor system, contents of the communication. The method also includes based at least in part on results of the analysis, predicting, using a machine learning system, a cognitive response of a recipient of the communication, and based at least in part on the predicted cognitive response, executing an alerting operation.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 2A depicts a system configured to generate alerts based at least in part on predicted mood responses to received electronic communications in accordance with one or more embodiments;

FIG. 2B depicts a system configured to generate alerts based at least in part on predicted mood responses to received electronic communications in accordance with one or more embodiments;

Figure 1:
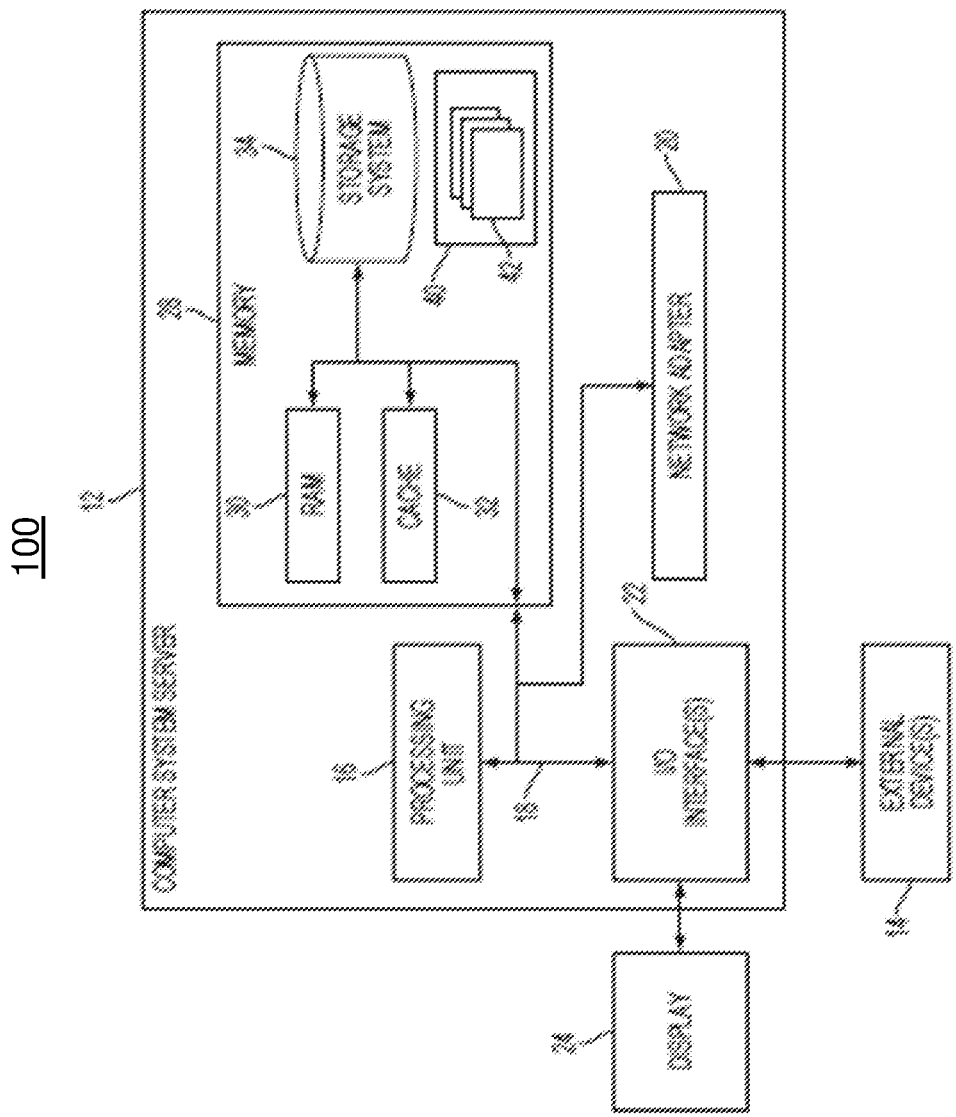
FIG. 1 is a block diagram illustrating one example of a processing system for practice of the teachings herein.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In an enterprise setting, emails and other messaging applications are commonly used to distribute information and tasks to the employees. Generally, each email user is capable of searching and managing their emails. The default settings of many email applications from the top of the email stack according to the latest email received and users can work their way through to the bottom. Each of the employees can manually sort their emails based one or more fields such as date, subject, sender, etc. based on their preferences.

One or more techniques described herein provide the ability to organize messages or provide indications to the user of how each message can affect the cognitive state of the user based on a past history of receiving similar type messages.

However, conventional applications do not have a sorting or organization function based on the effect the messages may have on the cognitive state of the receiver. For example, a user is not currently able to sort their emails based on the amount of stress the received emails are predicted to cause the user or sort their messages based on how happy/good the message is perceived by the user. The current first-in first-out method of reviewing emails does not necessarily leverage the user's strengths in reviewing messages. Because current applications lack this feature, users are not able to manage their emails and tasks based on the effects to them, therefore impacting their efficiency and workflow.

For example, some users may prefer organizing their communications in an order where the most stressful and complicated tasks are provided first. A different user may prefer to have communications organized where the good news is ordered first to place them in an optimistic mood. The techniques provided herein allow the user to organize their workflow based on the effects it may have on the user. Conventional applications fail to consider how the cognitive state after reading messages can affect a user's efficiency.

Turning now to an overview of the aspects of the invention, one or more embodiments of the invention address the above-described shortcomings of the prior art by providing computer-implemented methods to predict a user's cognitive response to a message and execute an action based on the predicted cognitive response. Different actions can be executed based at least in part on the user's preferences to increase the user's efficiency and productivity. For example, a user can have their email messages sorted or re-ordered based on a predicted cognitive effect of each message. In one or more embodiments, the sorting preference can be selected by the user as part of a configuration of the system prior to receiving one or more messages, or the sorting preference can be selected by the user after receiving one or more messages. In the latter case, the user may express a sorting preference as a selection, and the system can respond by providing an alert to the user including an execution of the selected sorting preference and a display of the sorted messages. Additionally, sorting preferences can be changed repeatedly by the user until a desired sorting of messages is alerted and displayed by the system.

The alerting operation/action can provide an indication to the user of the cognitive response after reading the message. The user can use the indication to sequence their workload. For example, some users may prefer to handle the tougher or more complex messages earlier in the work day. These messages can be sequenced as a priority to the user over the easier other messages and/or tasks. In another scenario, a user may be in a meeting and might not want their attention to be taken away by a message if checked during the meeting. However, the user may prefer to read simple messages that do not require much of his attention during the meeting. These messages can be provided to the user during the meeting and the other complex messages may be withheld from the user until the meeting is over. This can improve the work flow of the user by prioritizing their messages and tasks according to their preferences and strengths based on a predicted cognitive state of the user.

The techniques described herein analyze received messages to predict the effect that the message may have on the reader. Using the information associated with the predicted effect, a user can organize and address one or more of the received messages according to the effect. A user can increase the efficiency in which tasks are performed by grouping tasks based on their complexity, or the user can delay unimportant messages from distracting the user from a current task given the user's current mood.

One or more embodiments are also configured to factor the user's current mood, circumstances, other contextual information, etc. to determine an effect the message will have on the user and take an alerting action accordingly.

The above-described aspects of the invention address the shortcomings of the prior art by providing techniques that allow the system to peer into each of the messages to determine an order preferred by the user where the ordering is based at least in part on the predicted cognitive response of the user. For example, the emails can be presented in a sequence where the user prefers to hear the good news first and further work their way down to the other news.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1. One or more of the components/modules of FIG. 1 can be implemented in the system 200 described below.

Referring now to FIG. 1, a schematic of an example of a computing node is shown. Computing node 10 is only one example of a suitable cloud computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

FIG. 2A depicts a system 200A embodying aspects of the present invention. The system 200A includes a messaging system 202 and a user device 204A, configured and arranged as shown. In one or more embodiments, the messaging system 202 can be a social media messaging application, an email application, or other type of communication or messaging system. In one or more embodiments, the communication is any of an instant message, phone, fax, blog text, discussion text, newsgroup text, etc. It is to be understood that types of digital communication can be used. The system 200A can include one or more user devices 204A. The user devices 204 can include any mobile device and/or computing devices.

FIG. 2B depicts a system 200B including user device 204A that depicts an example implementation of the user device 204A shown in FIG. 2A. The user device 204A can include a plurality of components and/or modules. It is to be understood that more and/or different elements can be used to implement the user device 204A. In this non-limiting example, the user device 204A includes a message analyzer 210, an image capture device 212, and a mapping table 214, configured and arranged as shown. In one or more embodiments, the message analyzer 210 and the mapping table 214 can be configured in the messaging system 202. In addition, the message analyzer 210 and mapping table 214 can be configured in both the messaging system 202 and the user devices 204A.

In accordance with one or more embodiments of the present invention, the message analyzer 210 can include a sentiment/tonal detection module that include a sentiment analysis module and a tonal analysis module (not shown).

The sentiment analysis module can be utilized for evaluating the sentiment quality of a communication. The sentiment analysis module may be provided by IBM® WATSON® Alchemy Language application program interface (API) or WATSON® Natural Language Understanding API. The above mentioned APIs are mentioned for exemplary purposes. Any cognitive AI can be utilized within the sentiment analysis module. The sentiment analysis module can process natural language to incorporate both a linguistic and statistical analysis in evaluating the context of a communication. In text analysis, the sentiment is the attitude or opinion expressed toward something. Sentiment can be positive, "sounds good", negative, "this is bad", or neutral. Sentiment can be calculated based on keywords extracted and evaluated at a keyword level. Additionally, the sentiment analysis may be capable of identifying negations, such as the term "not" and the change in sentiment from the keyword "good" when the phrase is "not" "good". The sentiment analysis may consider intensity when the terms "very" or other adjectives are utilized in combination with a keyword. Additionally, the keywords may be weighted. For instance, a positive phrase such as "like" will have a predefined positive weight, whereas the phrase "love" might have a higher predefined positive weight. Additionally, negative weights may be afforded negative phrases such as "dislike" would have a predefined negative weight and the phrase "hate" might have a higher negative weight. The sentiment analysis module can evaluate the content to provide a sentiment level. This sentiment level may also include an intensity value.

The tonal analysis module may be IBM® WATSON® Tone analyzer service, for example. The tonal analysis module can use linguistic analysis to detect three types of tones from the text. The natural language content is analyzed by the tonal analysis module for determining the emotional impact, social tone, and writing style that the content projects. The tonal analysis module may provide tonal scores for emotional tone, social tone, and language tone. For emotional tone, the tonal analysis module may utilize the emotions for "joy", "fear", "sadness", "disgust" and "anger". Each natural language element is evaluated with respect to each emotion. Each emotion may be evaluated from lower values having a value range that indicates if that emotion is less likely to appear as perceived or alternatively to a higher value range if the emotion is more likely to be perceived with respect to each natural language content. Other emotions may be utilized as well as a different value score.

For social tone, the five elements of openness, conscientiousness, extraversion, agreeableness, and emotional range are utilized. Openness is evaluated as the extent a person is open to experience a variety of activities. This trait may be provided a value range indicating that it is more likely to be perceived as no-nonsense, straightforward, blunt and obvious, alternatively, a higher value range may be provided if the content indicates that it will be perceived as intellectual, curious, emotionally-aware, or imaginative. Conscientiousness is evaluated as the tendency to act in an organized or thoughtful way. This trait may be provided a value range if the presentation is perceived as spontaneous, laid-back, reckless, unmethodical or disorganized, or alternatively, a higher value range may be provided if the content is perceived as disciplined, dutiful, or confident. Extraversion is evaluated as the tendency to seek stimulation in the company of others. This trait may be provided a value range if perceived as independent, timid, introverted, restrained, boring, or alternatively, a higher value range may be provided if the content is perceived as engaging, seeking attention, assertive, sociable. Agreeableness is evaluated as the tendency to be compassionate and cooperative towards others. This trait may be provided a value range if the presentation is perceived as selfish, uncaring, uncooperative, confrontational or arrogant, or alternatively, a higher value range may be provided if the content is perceived as caring, sympathetic, cooperative, or trustworthy. The emotional range is evaluated as the tendency to be sensitive to the environment. This trait may be provided a value range if the presentation is perceived as calm, bland, content, relaxed or alternatively a higher value range may be provided if the content is perceived as concerned, frustrated angry, passionate, upset, stressed or impulsive. These tones, descriptions, and weights are merely illustrative and additional tones, descriptions or weights may be utilized.

Language tones may be analyzed to measure the user's writing style. The various styles may include analytic, confidence and tentative. The analytic style may focus on the individual's reasoning and analytical attitude about things. The analytic style may be provided a value range if the text contains little or no evidence of analytical tone or alternatively a higher value range if the presentation is more likely to be perceived as intellectual, rational, systematic, emotionless, or impersonal. The confidence style may focus on the presenter's degree of certainty. The confidence style may be provided a value range if the text contains little or no evidence of confidence in tone or alternatively a higher value range if the style is more likely to be perceived as assured, collected, hopeful or egotistical. The tentative style may focus on the presenter's degree of inhibition. The tentative style may be provided a lower value range if the text contains little or no evidence of tentativeness in tone or a higher value range if the style is more likely to be perceived as questionable, doubtful limited, or debatable.

In one or more embodiments, the message analyzer 210 determines the complexity of an email based on a number of factors. The message analyzer 210 is configured to scan each word of the message and determine the nature of the message. The subject of the message can also be scanned. In addition, the language used in the message can indicate the technical nature of the email. For example, an ordering of several steps and/or task can indicate the complexity of the message and/or deadlines can indicate an urgency of the message which can affect a reader's cognitive state when reading. It is to be understood that other factors can be used to determine the complexity of a message such as but not limited to the length of the message or the number of lines in the message. The time it takes the reader to read and/or respond to the message can be a factor. For example, a timer (not shown) and image capture device 212 can be used to determine how long it takes a reader to read through the message. The time can be started once a message is opened or when the image capture device 212 detects the reader's eyes begin to scan the message, and the timer can be stopped or paused when message is either minimized, closed, or replied to. The data obtained using the image capture device 212 can be used to determine how a user reacts to the message based at least in part on the user's facial features be detected by the image capture device 212 and correlated to previously received messages. The facial feature detection data can be correlated to similar messages that have been previously read by the reader to determine the user's reaction.

In some embodiments, the cognitive response of the user can be confirmed using information including analyzing the text and tone of the user's response to the received message, the facial expression of the user, or by other methods. The facial expression of the user can include comparing the eyebrows of the user using a camera or image capturing device 212. The variations in raising eyebrows can be used to determine the cognitive state of the user. In this non-limiting example, the cognitive state can be mapped according to the deviation in the user's eyebrow position.

In one or more embodiments, the image capture device 212 can be a camera installed on or coupled to a user device 204. The image capture device 212 can be configured to track a user's facial features as the user reads the received communication and/or prior to the user begins reading. For example, a user's eyebrows can be tracked to determine an emotion of a user. The image capture device 212 can initially capture a user's neutral eyebrow position and then a comparison can be made to the user's subsequent reaction where their eyebrow position can be tracked. For example, a sad response may indicate a lowering of the user's eyebrows of ¼ inches while a happy user may be indicated by a raising of the eyebrows by ½ inches. In addition, a stressful user may be indicated by the user's eyebrows being raised by ¾ inches. The cognitive state of the user being mapped to their eyebrow positions can be confirmed by the user by a plurality of ways.

The image capture device 212 can also be configured to track a user's eyes as the received communication is being read. This information can indicate when a user starts to read the message and when the user has completed reading the message. The time it takes a user to read the message can be used in determining the complexity of the received communication. For example, complex messages can take longer to completely read when compared to simpler messages. In addition, an average reading speed of a user can be used to determine whether a user is taking a longer time to read a message.

The user can be prompted by the system 202 or the user device 204A to confirm a predicted cognitive response to the received message. In embodiments of the invention, the reply communication sent in response to the received communication and/or time it takes the user to respond to the received communication can be used to confirm a user's cognitive response. For example, the message analyzer 210 can process the reply messages from the user to search for indicators of the user's cognitive state and can be used to confirm the predicted response.

As the user's responses to similar types of messages are collected over time, combinations of the user's responses to the types of messages can be used to predict a user's cognitive response to a future message. This data can be stored in the mapping table 214. In addition, time information can be stored in the mapping table 214 that is associated with a message type and a cognitive response. In one or more embodiments, the time information can include the time of day, the day of the week, week of the month/year, calendar information, etc.

For example, the user can have a different response when a message received during work hours, or more particularly during peak busy hours between working hours. This example, illustrates that a user can have a different response to the same message depending on when the message was received and the user's response can change with time.

The mapping table 214 can also store information indicating a duration the user is likely to remain in a particular cognitive state which is based on the user's previous cognitive responses and durations. In one or more embodiments, the alerting action can be based on the duration of the duration of a cognitive response. This information can be used to determine patterns that may be associated with how a user is likely to respond to a received message.

In addition, different users may have a different response to another colleague and/or co-worker. In another embodiment, a user's cognitive responses to messages types can change over time. For example, as a user becomes more comfortable at a new job or as the user obtains expertise in a certain area, a particular message from the boss may have less of an impact on the user's cognitive state. In another example, the user's work schedule may change, and therefore a user's cognitive responses may change based on the user's work schedule.

In one or more embodiments, the device 204B can include other modules 216. The other modules can include other processing modules, power components, or other hardware/software elements. In one or more embodiments, one or more components 210-216 can be distributed among the other devices 204 and/or systems 202 in a different configuration.

In embodiments of the invention, the system 200A can determine the current cognitive state of the user by using an image capture device or other biometric sensor. This information can be used and factored into the analysis when determining an action to execute based on a predicted cognitive state of the recipient when the reading the message. For example, a user that initially prefers to have the toughest most complex tasks provided in the early working hours, the system can detect the current state of the user as in a high stress state based on a facial features of the user and/or detected biometrics readings of a user, the system can rank the complexity of the tasks and give the user a medium complex task instead of a high level complex task based on the current detected state of the user. In this non-limiting example, the user's current state can be used along with the message type and historical data to determine an action to take for the received message. Information can include the duration of the predicted cognitive state based on the past responses of the user to similar messages.

In other embodiments, the current cognitive state of the user can be determined based on a user's calendar. The information provided in the calendar can indicate the number of meetings on a given day, length of the meeting, location of the meeting, the type of meeting, the individuals invited to the meeting (e.g. department, supervisors, etc.), description of the meeting, and other information. It can be gleaned from the user's calendar a stress level of the user based on the provided information.

Other contextual information can be used when predicting a cognitive state of the user such the user's level of attentiveness, sleep state, emotionally agitated, etc. These signals can be analyzed with machine learning.

In one or more embodiments, the cognitive response of the reader can be mapped to a complexity of the received communication by correlating the predicted response to previously received emails. The mapping can be based on a history of the user's cognitive response of similar types of messages. The previously received messages can be analyzed to determine their complexity and the user's cognitive response to each of the messages.

In some embodiments, an alerting action can be based on the time of day the communication is received or a location of the user. For example, messages may be handled differently if they are received during working hours or when a user is on vacation. Also, the location of a user may be used to indicate the user is at work or sitting in rush hour traffic. Messages that have been predicted to cause the user stress can be delayed or indicated as such so that additional stress is not provided to the user when he is at work or in traffic. In addition, other contextual information associated with the user can be used to predict a cognitive response of the user.

A cognitive response of the user can include stress, neutral, happy, sad, etc. A cognitive response can be any of emotional response, biometric response, predicted mood, predicted duration of triggered mood, etc.

In another embodiment, the predicted cognitive response can be based on an advertisement or promotion in the received message. For example, advertisements and promotions are commonly included in emails which can be used in the prediction analysis.

In one or more embodiments, the cognitive response of a user can be indicated on a user calendar, where different colors can indicate different moods. As the user's history is developed patterns can be recognized and factored when determine the effect of a user's cognitive response. For example, if Monday's and Thursdays are the most stressful days for a user do to manage their workload, high stress inducing emails that are not flagged as urgent may be delayed and delivered at a later time when the user is not as burdened with their workload. In another example, Fridays may be the least stressful for a particular user so stressful emails will be delivered to the user without any delay.

In one or more embodiments, a confidence interval can be used to reinforce the system's prediction of the reader's cognitive response to an email message. For example, a reply message to the response can be analyzed to determine the user's actual cognitive response. The facial features of the user can be analyzed. The user can be prompted and asked to confirm a particular predicted cognitive response as a message is read. If the system correctly predicts the cognitive response for a message, a confidence level that is stored in the mapping table can be incremented. Conversely, in the event the prediction is incorrect, the confidence level can be decremented accordingly.

Figure 3:
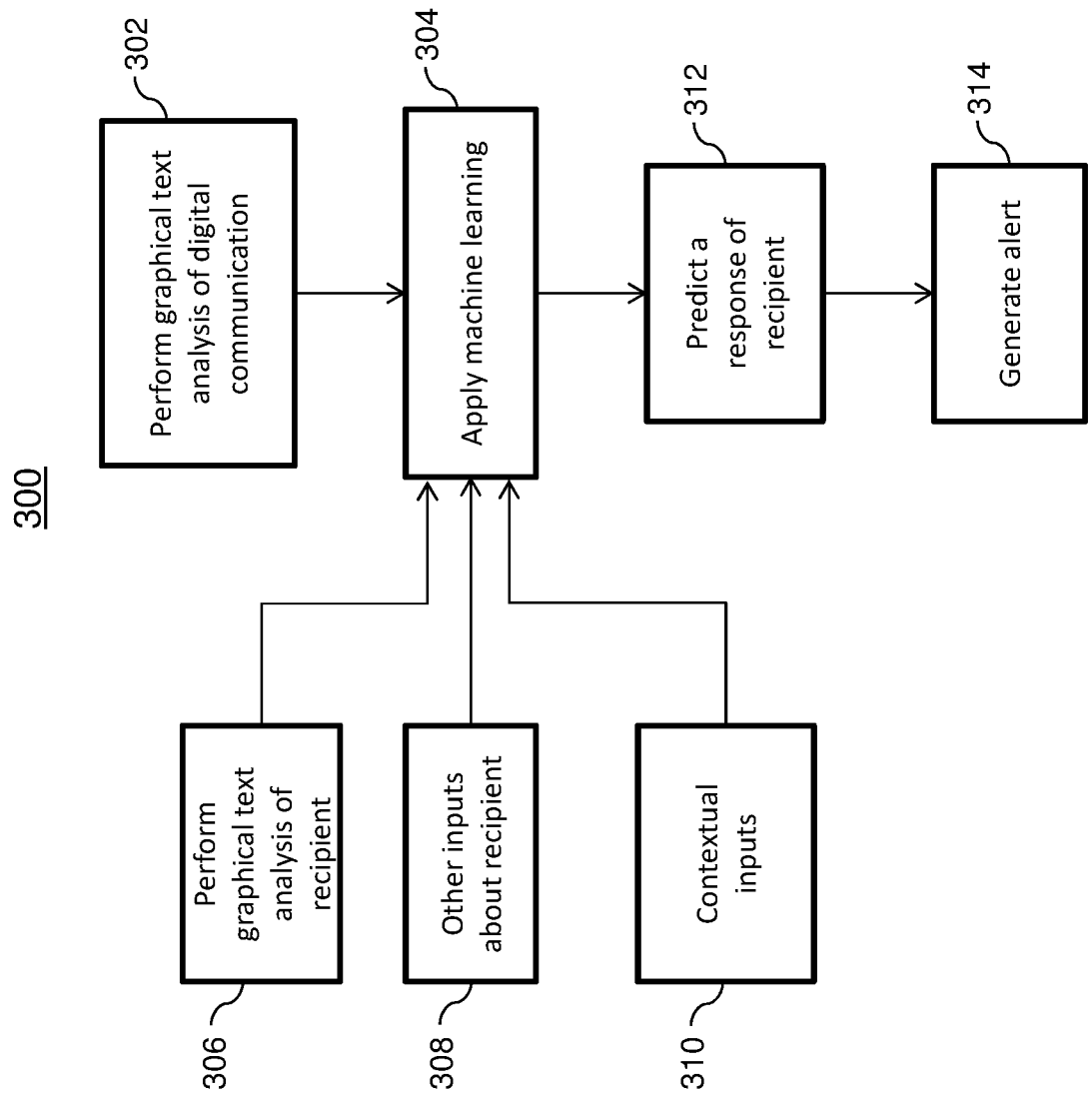
FIG. 3 depicts a system configured to generate alerts based at least in part on predicted mood response to received electronic communications in accordance with one or more embodiments.
Figure 4:
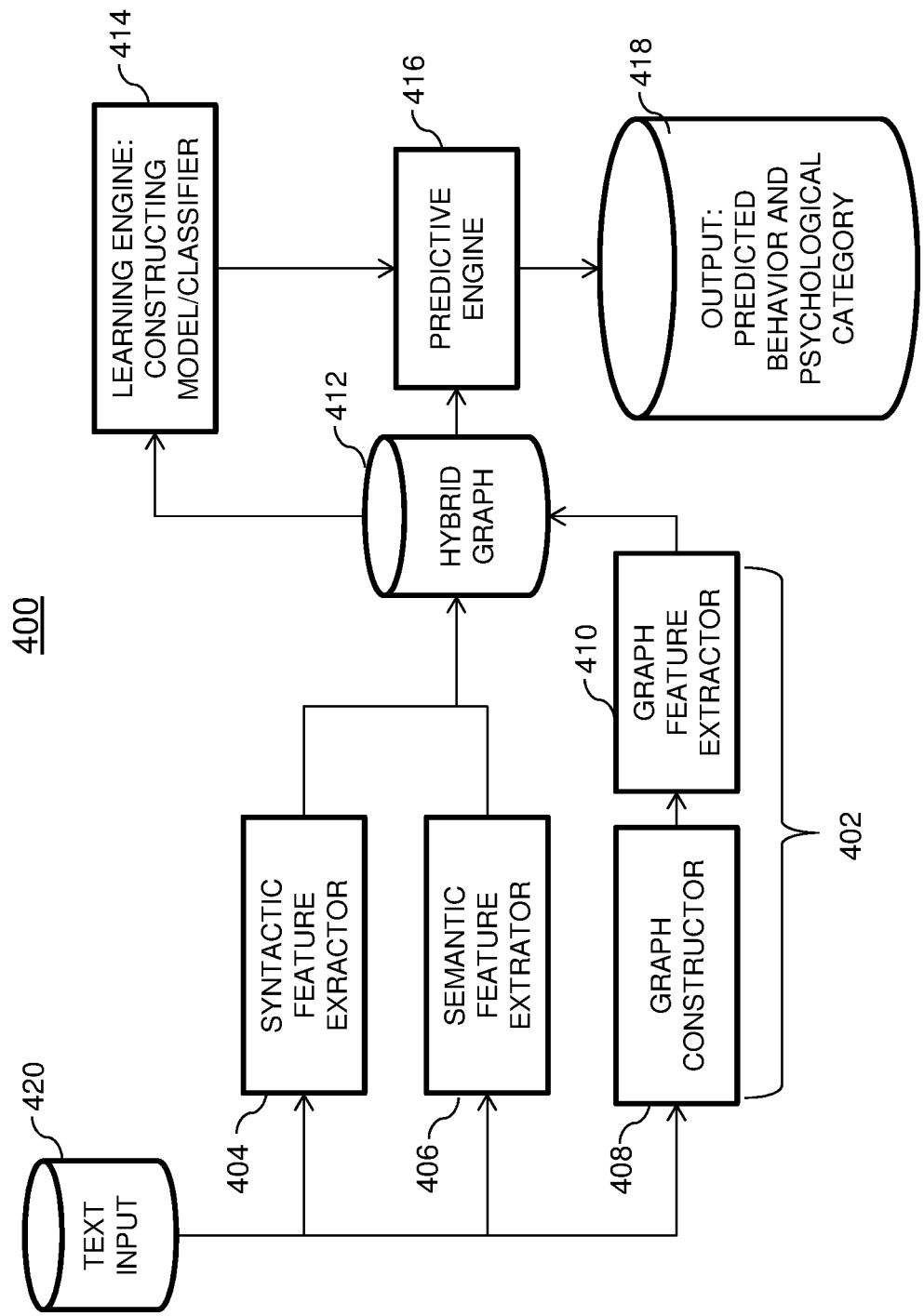
FIG. 4 depicts a system configured to generate alerts based at least in part on predicted mood responses to received electronic communications in accordance with one or more embodiments.

FIG. 3 depicts a flow chart to generate alerts based at least in part on predicted mood responses to received electronic communications in accordance with one or more embodiments is shown. Block 302 provides performing a graphical text analysis of digital communication. The graphical text analysis includes receiving and analyzing emails, chats, blogs, social media content, advertisements, web content, etc. Block 304 provides applying a machine learning or machine learning algorithm system. In one or more embodiments, the machine learning can occur as shown in FIG. 4. It should be understood that other machine learning algorithms can be used.

Block 306 provides performing graphical text analysis of recipient. In one or more embodiments, the graphical text analysis includes parsing the text of the received communication and comparing the results with that stored in a database to reveal words and the relationships among the words.

Block 308 provides receiving other inputs about the user. In one or more embodiments, other inputs can include a user's calendar information. Block 310 provides receiving contextual inputs. In one or more embodiments, contextual inputs can include detecting a user's current mood based on facial recognition. An image capture device or microphone can be used to ascertain the user's facial expressions or audibly determine the user's excitement level. In addition, other information can be used to determine other contextual data.

Block 312 provides determining a response of the recipient. Embodiments include determining the cognitive response of the recipient of the communication. In one or more embodiments, the words, relationships among words, contextual inputs, other inputs, etc. are all considered in combination to predict a cognitive response of the recipient. Block 314 provides generating alert. In one or more embodiments, the alert or alerting operation includes sorting messages according to a predicted cognitive response of the recipient or delaying a message to the recipient based on the predicted cognitive response.

FIG. 4 depicts a diagram of the message analyzer 210 having a graphical text analysis module 402 according to one or more embodiments. The message analyzer 210 is an implementation of message analyzer 210 (shown in FIG. 2B). Message analyzer 210 includes text input 420, a syntactic feature extractor 404, a semantic feature extractor 406, a graph constructor 408, a graph feature extractor 410, a hybrid graph circuit 412, a learning engine 414, a predictive engine 416 and an output circuit 418, configured and arranged as shown. In general, graphical text analysis module 402 functions to convert inputs from text input circuit 420 into hybrid graphs, which is provided to learning engine 414 and predictive engine 416. In addition, additional details of the operation of message analyzer 402 are available in a publication entitled "Speech Graphs Provide A Quantitative Measure Of Thought Disorder In Psychosis," authored by Mota, et al., and published by PLOS ONE, April 2012, Volume 7, Issue 4, the entire disclosure of which is incorporated by reference herein in its entirety.

As noted, message analyzer circuit 402 provides word graph inputs to learning engine 414, and predictive engine 416, which constructs predictive features or model classifiers of the state of the individual in order to predict what the next state will be, i.e., the predicted behavioral or psychological category of output circuit 418. Accordingly, predictive engine 416 and output circuit 418 may be modeled as Markov chains.

Figure 5:
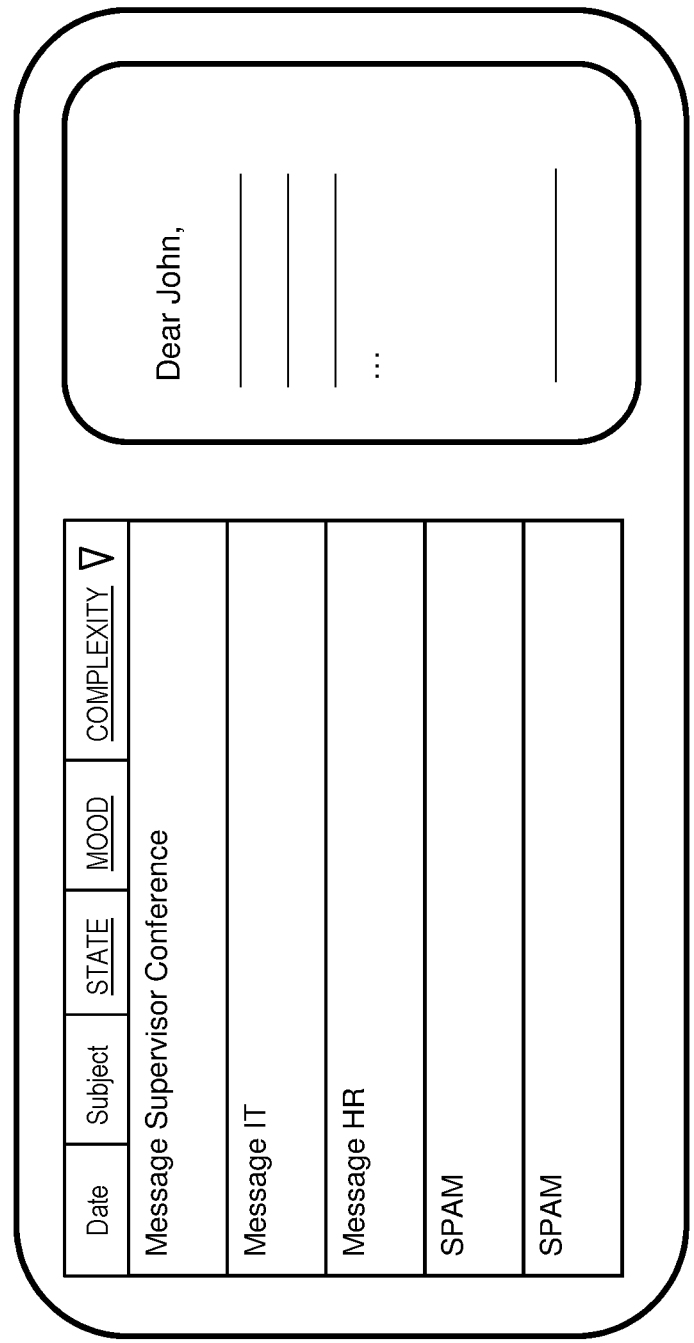
FIG. 5 depicts a messaging system in accordance with one or more embodiments.

Now referring to FIG. 5, an example communication system 500 in accordance with one or more embodiments is shown. The communication system 500 is associated with an email application which is configured to send and receive messages over one or more networks.

In this embodiment, the received messages can be sorted based on a user's current mood or the complexity of the received communications. This improves over the conventional email systems where messages can only be sorted based information such as the date, subject, sender, etc. The improvement also includes providing additional options for classifying, sorting, and organizing messages based on the user's predicted cognitive state for each received message. Although, the additional columns include the cognitive state, mood, and complexity of the user, it is to be understood that additional columns and/or different columns can be used to organize the received messages of the user.

In a non-limiting scenario, the user prefers to have their most stressful and/or complex tasks prioritized first. According to this scenario, the Supervisor Conference is prioritized first, followed by a message from information technology (IT) and human resource (HR). The "spam" messages are provided last because they are generally irrelevant and do not affect the user's cognitive state of being stressed.

In one or more embodiments, indicators can be provided to a user to assist the user in determining whether a message should be reviewed now or can be reviewed at a later time. In a scenario where a user is in an important meeting, all non-critical messages can be delayed and delivered to the user at another time. In another embodiment, the user can receive the incoming messages; however, the appearance of the message can be modified to indicate the type of message being received by the user.

In a non-limiting example, an indicator of the incoming message can be provided to a user based on the appearance of the message. In another example, a distinct sound or vibration pattern can be associated with one or more predicted cognitive responses. Also, the background or subject line of the message can include a color indicating a predicted cognitive response. The border of the message can be highlighted to indicate a predicted cognitive response. For example, the color red can indicate a stressful response while the color blue can represent a neutral cognitive response and the color green can represent a happy cognitive response. It is to be understood that other techniques can be used to indicate the predicted cognitive response such as but not limited to altering the communication text/window, a categorization action, a graphical indication the device, an audio indication on the device, size/font of text, and the addition of symbols/emoticons in subject lines.

Figure 6:
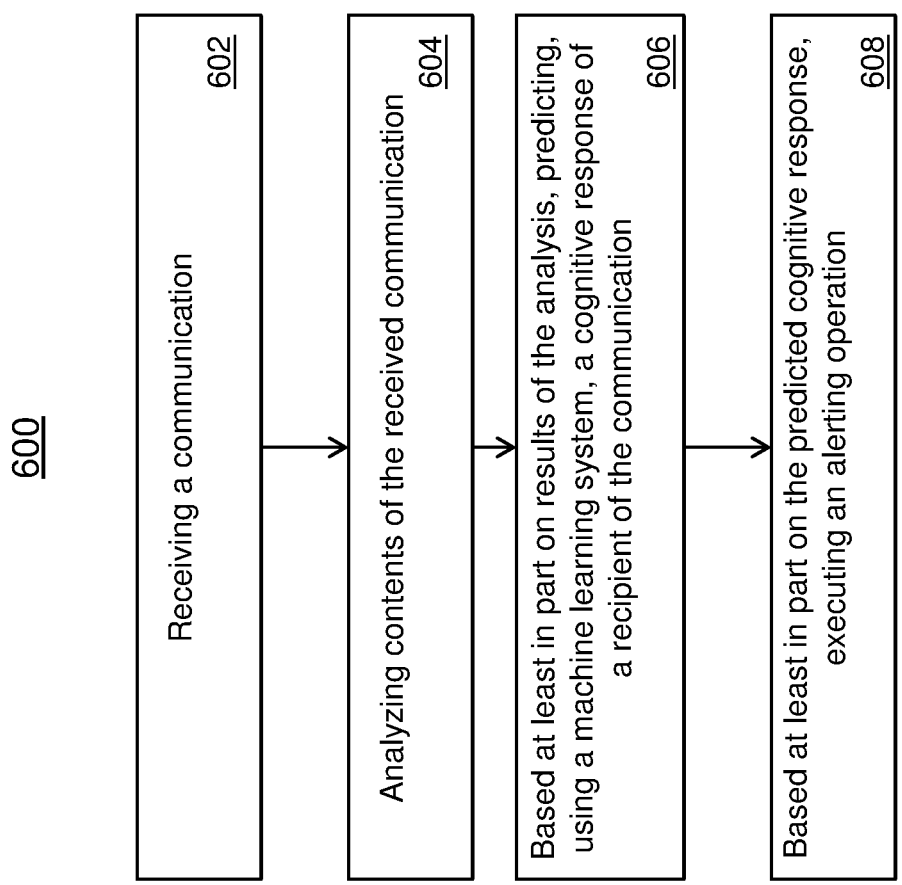
FIG. 6 depicts a flow chart for generating alerts based at least in part on predicted mood responses to received electronic communications in accordance with one or more embodiments.

Now referring to FIG. 6, a method 600 for operating a message communication system and forecasting mood responses is shown. Block 602 provides receiving a communication. In one or more embodiments, the communication is a received email message. In addition, the communication can include any of an instant message, phone, fax, blog text, discussion text, newsgroup text, etc. It is to be understood that various types of digital communication can be used.

Block 604 provides analyzing the received communication. In one or more embodiments, the analysis includes parsing the text of the message to determine the complexity of the message. The analysis includes determining the length of the message and determining the technical terms in the message. In addition, the analysis includes determining the sender and subject line of the message, if a subject line exists. The analysis further includes determining whether the message is flagged as urgent.

In one or more embodiments, the analysis includes comparing a history of previously received messages, where the similarity can be based on one or more of the length, the technical terms used, the time of day, the sender, etc. and the reaction of the used based on one or more of a response of the user. In some embodiments, the response of the user includes measuring facial characteristics using an image capture device such as eyebrow movements or mouth position or other facial features. In addition, other indicators such as biometric indicators can be detected and used to predict the cognitive response of the user.

Block 606 provides predicting a cognitive response of a user based at least in part on the analysis. In one or more embodiments, the prediction of the cognitive response uses a historical mapping of similarly received messages. In one or more embodiments, contextual data surrounding the user can also be stored in the mapping table and used to predict the cognitive state.

Block 608 provides responsive to the predicted cognitive response, executing an alerting action. In one or more embodiments, the alerting action can include sorting received messages based on the predictive cognitive response, modifying the appearance of a message to indicate the predicted cognitive response of the user, providing an audible indication of the predicted cognitive response of the user, etc.

The techniques described herein analyze how a message is going to affect the user's cognitive state (emotional state). This can be correlated to emails that have been read and/or reviewed in the past to the responses of the user. Based on the correlation, a ranking can be used to sort, re-order, or modify the presentation of the message.

Figure 7:
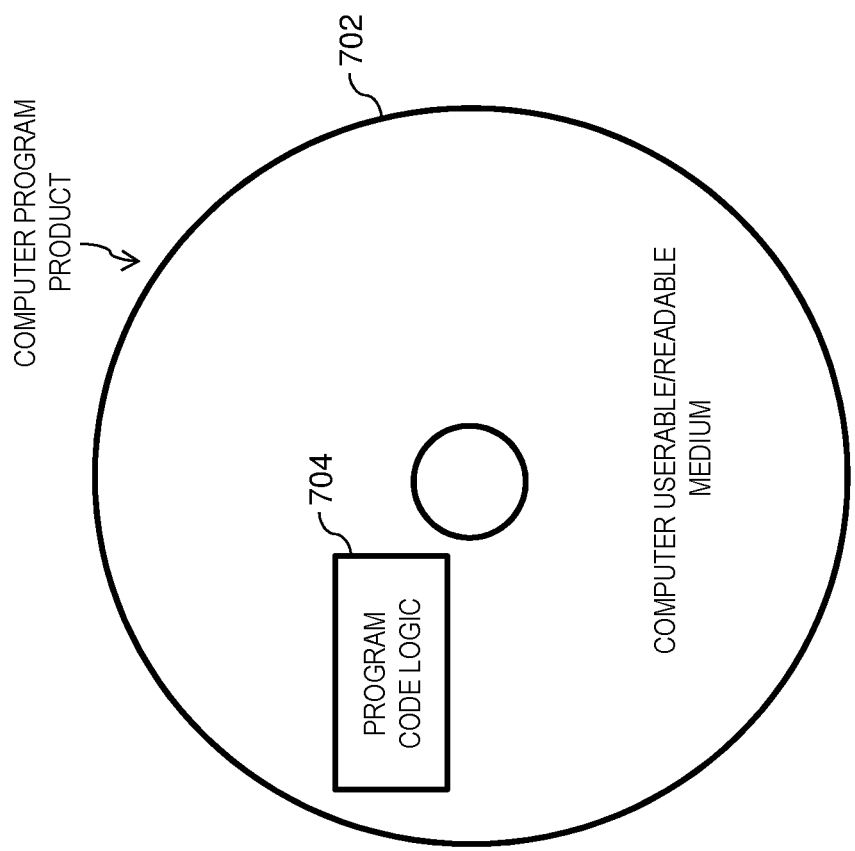
FIG. 7 depicts a diagram of a computer program product according to one or more embodiments.

Referring now to FIG. 7, a computer program product 700 in accordance with an embodiment that includes a computer readable storage medium 702 and program instructions 704 is generally shown.

The techniques described herein not only factor the tone of a communication but also factors the impact the communication has on a reader and leverages the information to organize their messages. A particular message can have a different affect amongst a number of users based on each user's cognitive response and based on each user's sensitivities. The invention is not limited to considering a number of words or lines of the message to determine its effect, but includes a number of factors. In other words, it is not simply the length of the message that is used to predict the user's cognitive response of the reader but a deeper analysis into the language of the message and surrounding context of the user to predict the cognitive state of the user. The techniques described herein provide a means for estimating the cognitive response based on at least one of learning from a user history, active learning and feedback, a combination of information content such as time of day, day of the year, sender, etc.

As a user's efficiency in managing messages/tasks increase, the overall efficiency in the flow of information and reduction in overhead in the network can occur. For example, users will not be faced with starting and stopping tasks based on be interrupted by a non-optimal workflow according to the user's preferences and personal mood. Therefore, mapping the user's cognitive response to similar types of previously received messages to predict the cognitive response of the user increases productivity.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for generating an alerting operation based on predicted cognitive responses, the computer-implemented method comprising:
   receiving, using a processor system, a communication;
   analyzing, using the processor system, contents of the communication;
   based at least in part on results of the analysis, predicting, using a machine learning system, a cognitive response of a recipient of the communication, wherein the predictive cognitive response is determined based at least in part on historical reply communications from the recipient; and
   based at least in part on the predicted cognitive response, executing, using the processor system, the alerting operation, wherein the alerting operation includes sorting received communications of the recipient of the communication based at least in part on the predicted cognitive response, wherein the predicted cognitive response is based at least in part on at least one of an emotional response, a biometric response, a predicted mood, or a predicted duration of mood.

2. The computer-implemented method of claim 1, wherein the predicted cognitive response is based at least in part on and selected from the group consisting of a response time of the user and verbiage of the received communication.

3. The computer-implemented method of claim 1, wherein the alerting operation includes one of modifying an appearance of the received communication and providing an audible indication based at least in part on the predicted cognitive response.

4. The computer-implemented method of claim 1, wherein the alerting operation includes delaying timing and delivery of the received communication based at least in part on the predicted cognitive response.

5. The computer-implemented method of claim 1, wherein the alerting operation is based at least in part on a preference of the recipient.

6. The computer-implemented method of claim 1 further comprises mapping the predicted cognitive response to a user preference.

7. The computer-implemented method of claim 1, wherein the predicted cognitive response is based at least in part on historical data of the recipient.

8. The computer-implemented method of claim 1 further comprising:
   performing a confirming operation configured to confirm the predicted cognitive response of the recipient; and
   based at least in part on results of the confirming operation, increasing a confidence level associated with the received communication and the predicted cognitive response.

9. The computer-implemented method of claim 1, wherein the alerting operation for the predicted cognitive response is selected from the group consisting of a time of day and current cognitive state of the user.

10. A system comprising:
    a storage medium, the storage medium being communicatively coupled to a processor;
    the processor configured to:
      receive a communication;
      analyze contents of the communication;
      based at least in part on results of the analysis, predict, using a machine learning system, a cognitive response of a recipient of the communication, wherein the predictive cognitive response is determined based at least in part on historical reply communications from the recipient; and
      based at least in part on the predicted cognitive response, execute an alerting operation, wherein the alerting operation includes sorting received communications of the recipient of the communication based at least in part on the predicted cognitive response, wherein the predicted cognitive response is based at least in part on at least one of an emotional response, a biometric response, a predicted mood, or a predicted duration of mood.

11. The system of claim 10, wherein predicting the cognitive response comprises determining based at least in part on and selected from the group consisting of a response time of the user and verbiage of the received communication.

12. The system of claim 10, wherein the alerting operation is selected from the group consisting of one of modifying an appearance of the received communication and providing an audible indication, and delaying timing and delivery of the received communication.

13. The system of claim 10, wherein the predicted cognitive response is based at least in part on historical data of the recipient.

14. A computer program product comprising:
    a computer readable storage medium having stored thereon program instructions executable by a processor to cause the processor to:
      receive, using a processor system, a communication;
      analyze, using the processor system, contents of the communication;
      based at least in part on results of the analysis, predict, using a machine learning system, a cognitive response of a recipient of the communication, wherein the predictive cognitive response is determined based at least in part on historical reply communications from the recipient; and
      based at least in part on the predicted cognitive response, execute an alerting operation, wherein the alerting operation includes sorting received communications of the recipient of the communication based at least in part on the predicted cognitive response, wherein the predicted cognitive response is based at least in part on at least one of an emotional response, a biometric response, a predicted mood, or a predicted duration of mood.

15. The computer program product of claim 14, wherein predicting the cognitive response is based at least in part on and selected from the group consisting of a response time of the user and verbiage of the received communication.

16. The computer program product of claim 14, wherein the alerting operation is selected from the group consisting of modifying an appearance of the received communication, providing an audible indication, and delaying timing and delivery of the received communication.

17. The computer program product of claim 14, wherein the predicted cognitive response is based at least in part on historical data of the recipient.

* * * * *